Nov. 25, 1952    A. V. L. C. DEBRIE    2,619,006
BALANCED MECHANISM FOR DRIVING FILMS
Filed July 17, 1951    2 SHEETS—SHEET 1

INVENTOR.
Andre Victor Leon Clement
BY Debrie

Nov. 25, 1952     A. V. L. C. DEBRIE     2,619,006
BALANCED MECHANISM FOR DRIVING FILMS
Filed July 17, 1951     2 SHEETS—SHEET 2

Andre Victor Leon Clement   INVENTOR.

BY

Patented Nov. 25, 1952

2,619,006

UNITED STATES PATENT OFFICE 2,619,006

BALANCED MECHANISM FOR DRIVING FILMS

André Victor Léon Clement Debrie, Paris, France

Application July 17, 1951, Serial No. 237,146
In France August 9, 1950

4 Claims. (Cl. 88—18.4)

In numerous apparatus for taking sound pictures the downward displacement of the film is ensured by claws which penetrate into lateral perforations of the film and then move downwards while driving the film throughout the desired length, whereafter these claws withdraw from the film and come to take their initial position, whereas counter-claws, penetrating into further perforations of the film, maintain the latter in position and release the same at the very time when the next downward displacement should commence.

The displacement of the claws and counter-claws are generally controlled by cams to which the alternating efforts, producing the displacements of the claws, impart vibrations causing parasitic noises detrimental to the good operation of the apparatus.

The present invention has for its object to provide a picture taking mechanism which does away with said shortcomings and is essentially featured by that all parts in motion are balanced by means of a pendulous weight cam-controlled in such a way that at any instant the reactions of this weight upon the cam substantially balance the reactions due to the other parts of the mechanism.

Furthermore, the various motions of the cam engaging parts are transmitted to the subordinated parts by means of rotatable shafts extended lengthwise in such a way as to permit them to pass through corresponding stuffing-boxes mounted on a casing suitable for completely surrounding the cam in such a way as to ensure abundant lubrication of this cam.

Further features of said picture taking mechanism will be apparent from the following description and appended claims. This mechanism will be described, by way of non-limiting example, with reference to the accompanying schematic drawings in which:

Figure 1:
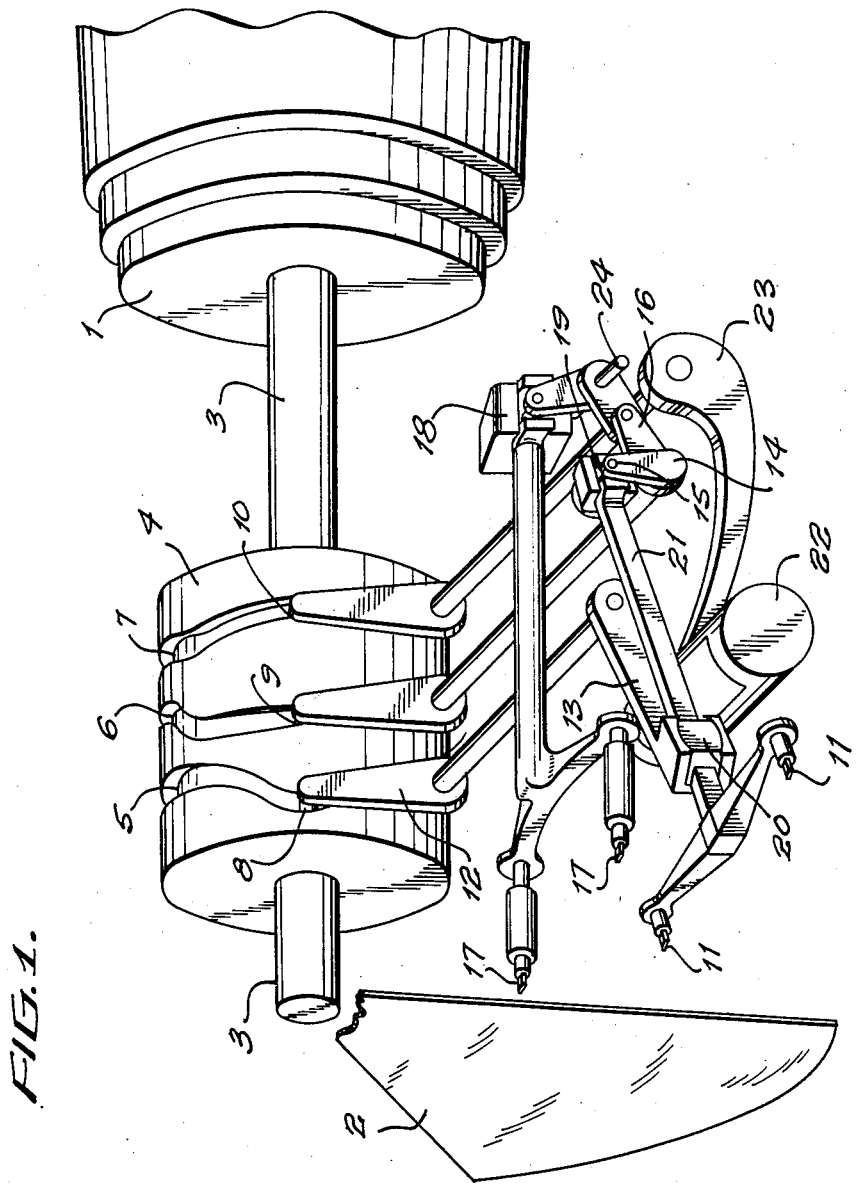
Fig. 1 is a perspective view of the mechanism mounted between the obturator and the motor on the very shaft of the latter.
Figure 2:
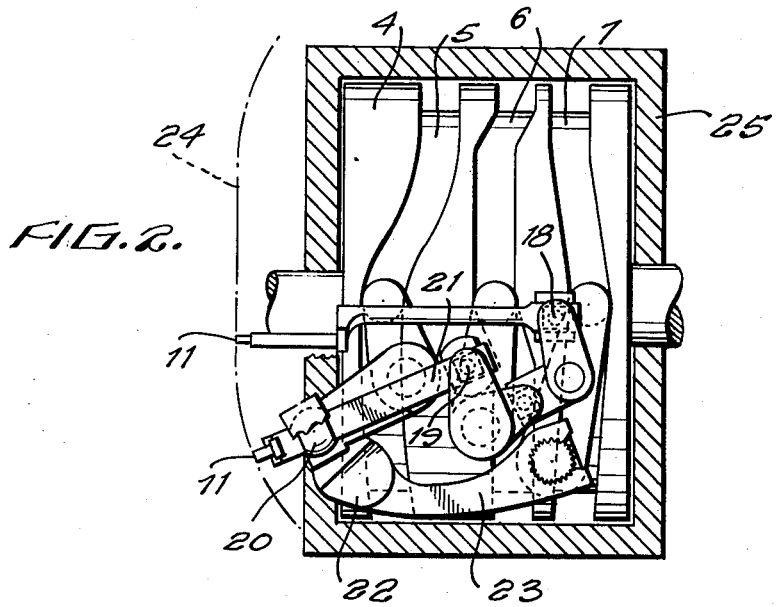
Fig. 2 is a plan view thereof.

The mechanism is constituted substantially by a cylinder 4 mounted on the shaft 3 of motor 1 and having three peripheral grooves 5, 6 and 7. Engaged into these grooves are corresponding followers 8, 9 and 10, which, through the intermediary of cranks such as 12, control the motion of oscillation about the corresponding axes of three shafts sticking out of stuffing-boxes mounted on a casing 25 (see Fig. 2) suitable for enveloping the cylindric cam 4.

The groove 5 controls both the downstroke and the upstroke of the claw 11, whereas the groove 6 controls the advance and the withdrawal of the claw 11 and of the counter-claw 17, penetrating into perforations of the film (not shown) passing in front of the obturator 2. Finally, the groove 7 actuates the balancing device constituted substantially by a pendulous weight 22.

The operation is easily understandable.

While following the groove 5, the first follower 8 imparts an oscillating motion to the crank 12 which, through the intermediary of a shaft and lever 13, drives the claw 11 and causes the same to move along a circular arc-shaped channel (Fig. 2) in which the film passes.

With this first motion come to combine the penetrating and withdrawing motions of the claw and counter-claw. To this effect, the follower 9, while moving along the groove 6, causes a double crank 14 to oscillate, whose end 15 actuates the claw 14, whereas the other end thereof actuates the counter-claw 17; the transmission of the motion of the latter claw is effected through the intermediary of a ball joint 18 of the type permitting of transforming the oscillating motion of the crank 16 into a rectilinear reciprocating motion of the counter-claw 17.

The transmission of the motion to the claw 11 is effected, on one hand, for the forward and backward motion, through the intermediary of the end 15 of double crank 14 and of a ball-joint 19, and, on the other hand, through the intermediary of a ball joint 20 carried by an arm 3 and through which may slide the claw carrying rod 21. The claw 11 thus described a sort of rectangle having its larger sides incurved. The shape of grooves 5 and 6 is such that the two motions succeed each other as follows:

The claw 11 in its uppermost position penetrates into the perforations, while the counter-claw withdraws from the film backwards.

The claw 11 pulls down the film throughout the desired length.

The claw 11 withdraws from the perforations, whereas the counter-claw 17 penetrates into further perforations to hold the film immovable during the exposure.

During this exposure the claw 11 rises and comes to take up its initial position, and the same operations recommence.

All these oscillating and reciprocating motions are very rapid and cause, on account of the reaction of the followers upon the grooves of the cylindric cam, vibrations resulting in parasitic noises that should be avoided.

Figure 3:
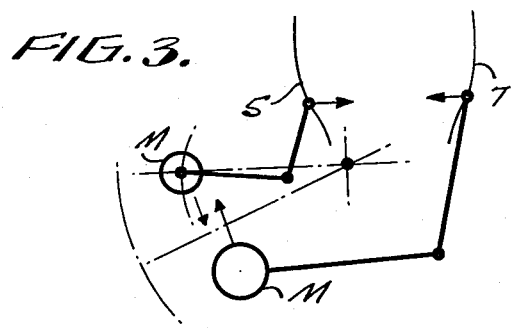
Fig. 3 is an explanatory diagram of the balancing system.

In order to damp these vibrations the cylindric cam 4 has a third groove 7 into which is engaged a follower 10 adapted to control an arm 23, to the free end of which is secured a counter-weight 22. As shown in Fig. 3, the groove 7 is inclined to the generating line of the cylinder 4 inversely with respect to the groove 5. Consequently, when the parts controlled by this groove move downwardly the counterweight 22 moves upwardly, and the respective reactions are of inverted sense.

It is therefore possible to obtain a balance by conveniently dimensioning the counterweight system, thereby eliminating shocks and vibrations, hence the noises resulting therefrom.

Figure 4:
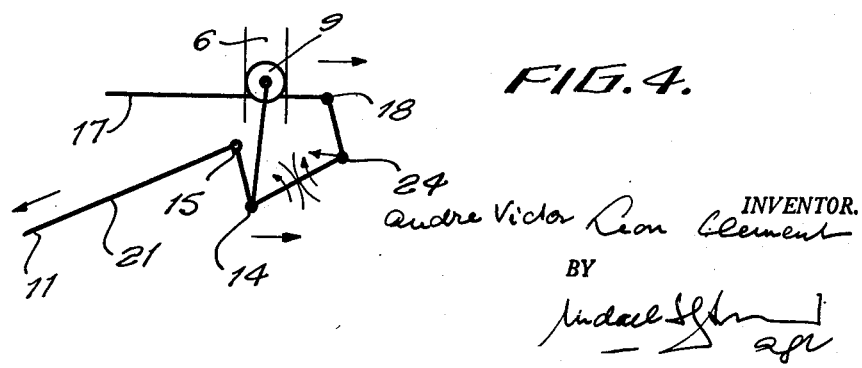
Fig. 4 is a schematic showing of the balancing system producing the advance and the withdrawal of claws.

In Fig. 4 is seen how there are balanced the penetrating and withdrawing motions of the claw and counter-claw.

What is claimed is:

1. Self-balancing mechanism for driving perforated films by means of a claw and counter-claw, which comprises substantially three cylindric cams made rigid with a drive shaft and provided with peripheral grooves, and three corresponding followers engaged into, and oscillating under the action of, said grooves; the oscillations of a first follower being such as to cause the downward and upward displacement of the claw, and the oscillations of a second follower being such as to cause the penetration of the claw into, and its withdrawal from, the film perforations and simultaneously the forward and backward motions of the counter-claw, whereas the oscillations of a third follower are such as to cause oscillations of a pendulous mass whose reactions on the corresponding cam practically balance the reactions due to the displacements of the parts actuated by the other cams.

2. Self-balancing mechanism for driving perforated films by means of a claw and counter-claw, which comprises, in combination, three cylindric cams made rigid with a drive shaft and provided each with a peripheral groove; three corresponding followers each of which is engaged into the corresponding peripheral groove; three corresponding crank-shafts each of which carries, at its crank end, the corresponding follower and is caused to oscillate under the combined action of the follower and the corresponding groove; means whereby the oscillations of a first crank-shaft may be transmitted in such a way as to cause the downward and upward displacement of the claw; means whereby the oscillations of a second crank-shaft may be transmitted in such a way as to cause the penetration of the claw into, and its withdrawal from, the film perforations and simultaneously the forward and backward motions of the counter-claw; and means whereby the oscillations of a third crank-shaft may be imparted to a pendulous mass whose reactions on the corresponding cam practically balance the reactions due to the displacements of the parts actuated by the other cams.

3. Mechanism as defined in claim 2, wherein said three cylindric cams are confined in a tight housing to ensure abundant lubrication of said grooves and followers, said housing being provided with three stuffing-boxes through which said three crank-shafts pass and stick out, respectively.

4. Self-balancing mechanism for driving perforated films by means of a claw and counter-claw, which comprises, in combination, three cylindric cams made rigid with a drive shaft and provided each with a peripheral groove, and three corresponding followers each of which is engaged into the corresponding groove and is caused to oscillate under the action of the corresponding groove; means whereby the oscillations of a first follower are transmitted in such a way as to cause the downward and upward displacement of the claw; means whereby the oscillations of a second follower may be transmitted in such a way as to cause the penetration of the claw into, and its withdrawal from, the film perforations and simultaneously the forward and backward motions of the counter-claw; and means whereby the oscillations of a third follower may be transmitted to a pendulous mass whose reactions on the corresponding cam practically balance the reactions due to the displacements of the parts actuated by the other cams.

ANDRÉ VICTOR LÉON CLEMENT DEBRIE.

REFERENCES CITED

The following references are of record in the file of this patent:

UNITED STATES PATENTS

| Number | Name | Date |
|---|---|---|
| 1,400,877 | Hillman | Dec. 20, 1921 |
| 1,450,343 | Wescott | Apr. 3, 1923 |